United States Patent Office 3,560,468
Patented Feb. 2, 1971

3,560,468
SUSPENSION POLYMERISATION OF STYRENE
James Keith Hambling, Frimley, near Aldershot, Colin Temple Richards, Old Windsor, and John Mansel Squire, Thorpe, England, assignors to The British Petroleum Company Limited, London, England, a corporation of England
No Drawing. Filed Mar. 5, 1968, Ser. No. 710,677
Claims priority, application Great Britain, Mar. 8, 1967, 10,826/67
Int. Cl. C08f 7/04
U.S. Cl. 260—93.5      4 Claims

ABSTRACT OF THE DISCLOSURE

Olefinically unsaturated monomers, particularly styrene, are polymerised in aqueous suspension by a process which comprises reacting an alkyl hydroperoxide, e.g., tert butyl hydroperoxide with a hydroxy acid of sulphur which possesses reducing properties or a salt of such an acid, e.g., sodium formaldehyde sulphoxylate, in water, subsequently adding a suspending agent, monomer and catalyst, and polymerising the monomer.

---

This invention relates to the polymerisation of olefinically unsaturated compounds in suspension.

Processes for the polymerisation of olefinically unsaturated compounds in aqueous suspension are known. Such processes generally employ suspending agents and wetting agents or "extenders" as they are sometimes called, in addition to polymerisation catalysts of the free radical type.

Polymers formed in an aqueous suspension process are produced in the shape of beads. It is the function of the suspending agent to maintain the polymerising monomer in suspension to prevent or reduce the tendency of polymer beads to agglomerate or "sugar-crust." A "sugar-crust" occurs when the formed polymer beads stick together to form a hard crusty layer and is indicative of a late-stage suspension failure.

Many suspending agents are known. These include difficultly soluble phosphates such as calcium, barium and magnesium phosphates, basic phosphates such as hydroxy apatite, finely divided inorganic substances such as clay, talc, barium sulphate, titanium dioxide and protective colloids such as gum and cellulose ether. The suspending agents may be added as pre-formed materials or they may be prepared in situ. For example, hydroxy apatite may be prepared in situ by the double decomposition of sodium phosphate and calcium chloride added separately to the polymerisation medium.

Similarly, many wetting agents are known. These include anionic surface active agents such as sodium caproate and sodium oleate; organic sulphates and sulphonates such as long chain alkyl sulphates and sulphonates; alkyl aromatic sulphonates; aryl alkyl polyether sulphonates; sodium salts of alkyl phosphates; and the reaction product of tertiary butyl hydroperoxide (t-BHP) and sodium formaldehyde sulphoxylate (SFX). The concentration of the wetting agent used is critical, since too large an amount will cause formation of undesirable fine emulsion polymer and too little will not have the desired effect of bead size control.

When the t-BHP/SFX combination has been used previously as wetting agent, a considerable amount of fine polymer beads have been produced, together with fine powdery emulsion type polymer. Material in the form of fines is material lost to the process, since (a) it is difficult to recover, some inevitably being lost in transfer and drying operations, and (b) even if some is recovered, it is unsuitable for further processing. In addition, the finely divided polymer which remains suspended in the water phase renders this water unsuitable for discharge as effluent without further treatment.

Such a process also suffers from the disadvantage that unless reaction conditions are closely controlled, "sugar-crusting" of the polymer beads occurs.

We have now discovered that if a wetting agent system containing an alkyl hydroperoxide, such as t-BHP, and a hydroxy acid of sulphur which possesses reducing properties or a salt thereof, e.g., SFX, is employed and if, contrary to previous practice with this system, the hydroperoxide and the reducing agent are pre-reacted before the other components of the polymerisation recipe are added, then improved results are obtained on subsequent polymerisation. In particular, the quantity of fines produced and the tendency of the polymer to "sugar-crust" are both reduced. Another advantage of the pre-reaction technique is that it allows for reaction of all the hydroperoxide added, i.e., the hydroperoxide and reducing agent can be added in predetermined amounts which will allow for complete reaction of the hydroperoxide. Using the prior art procedure, an excess of hydroperoxide must be added to allow for partition between the aqueous and monomer phases.

Thus according to the present invention there is provided a process for the polymerisation of an olefinically unsaturated monomer in aqueous suspension which process comprises reacting an alkyl hydroperoxide with a hydroxyacid of sulphur which possesses reducing properties or a salt of such an acid in water, subsequently adding a suspending agent, monomer and catalyst, and polymerising the monomer.

The preferred hydroperoxide is tertiary butyl hydroperoxide.

The preferred reducing agent is sodium formaldehyde sulphoxylate.

The pH of the water in which the hydroperoxide and reducing agent react should be less than 7.

The preferred monomer is styrene. Other suitable monomers include ortho- and para- mono-chlorostyrenes, dichlorostyrenes, vinyl naphthalenes, acrylic acid derivatives such as methyl acrylate and ethyl acrylate, and vinyl acetate. High impact polystyrene may be prepared by a process according to the invention carried out in the presence of a rubbery material.

Suitable catalysts include benzoyl peroxide, tertiary butyl perbenzoate, lauroyl peroxide, di-tertiary butyl peroxide and 2-azo bis isobutyronitrile.

Other conventional ingredients of suspension polymerisation recipes, for example, white mineral oil and stearic acid, may also be added.

Reaction conditions, e.g. ratios and concentrations of ingredients and temperatures and times of polymerisation are conventional.

The pre-reacted wetting agent system is suitable for use within a broad temperature range of 40° to 200° C., unlike many conventional wetting agents. The preferred temperature range is 70° C. to 140° C.

The invention is illustrated by the following examples. Examples 1 and 3 are included for comparison purposes only.

EXAMPLE 1

The following ingredients were mixed.

| Components, grams | Quantity | O/A | T/A (° C.) |
|---|---|---|---|
| Water (demineralized) | 1,575 | 1 | |
| $Na_3PO_4 \cdot 12H_2O$ | 4.34 | 2 | 60 |
| $Na_2HPO_4$ | 1.71 | 3 | 60 |
| Styrene | 2,150 | 4 | 60 |
| White mineral oil | 47 | 5 | 60 |
| $CaCl_2 \cdot 2H_2O$ | 3.1 | 6 | 60 |
| Stearic acid | 2.17 | 7 | 60 |
| Benzoyl peroxide | 4.1 | 8 | 60 |
| Trigonox A-75 | 0.17 | 9 | 80 |
| Sodium formaldehyde sulphoxylate | 0.073 | 10 | 80 |

Trigonox A-75 is a 75 percent solution of t-BHP in ditertiary butyl peroxide.

O/A = Order of addition
T/A = Temperature of addition
0.17 g. Trigonox A-75 = 0.90 millimoles t-BHP/litre water
0.073 g. SFX = 0.30 millimoles/litre water A stable suspension was obtained throughout 24 hours at 90° C. 1.7 percent weight of the product was fine emulsion type polymer. The total amount of polymer passing BS 200 mesh sieve was 2.6 percent weight.

EXAMPLE 2

Example 1 was repeated with the difference that the t-BHP and SFX were reacted in water for 15 minutes at 80° C. prior to the addition of the other ingredients. A stable suspension was obtained throughout 24 hours at 90° C. 0.5 percent weight of the product was fine emulsion type polymer. The total amount of polymer passing BS 200 mesh sieve was 0.8 percent weight.

EXAMPLE 3

Example 1 was repeated with t-BHP and SFX concentrations adjusted to:

0.50 millimole t-BHP/litre water
0.21 millimole SFX/litre water

The suspension "sugar-crusted" after 12 hours at 90° C. 0.3 percent weight of the product was fine emulsion type polymer. The total amount of polymer passing BS 200 mesh sieve was 1.3 percent weight.

EXAMPLE 4

Example 2 was repeated with the concentrations of t-BHP and SFX used in Example 3.

The suspension was stable throughout 24 hours at 90° C. 0.02 percent weight of the product was fine emulsion type polymer. The total amount of polymer passing BS 200 mesh sieve was less than 0.1 percent weight.

It was found that when the t-BHP and SFX were reacted after the other recited components had been added to the suspension, that the concentrations of these components had to be critically controlled to avoid "sugar-crusting" before completion of the polymerisation. This was not the case when the t-BHP and SFX were pre-reacted, a wider range of concentrations could be employed without detriment to suspension stability. This is illustrated if Examples 3 and 4 are compared.

The minimum levels of t-BHP and SFX that could be used, in order to avoid "sugar-crusting," when the post reaction method was used, gave a minimum of 1.5 percent weight of fine emulsion type polymer. The pre-reaction technique allowed the use of lower levels of t-BHP and SFX without affecting suspension stability; at these low levels, the amount of fine emulsion type polymer produced was negligible.

What we claim is:

1. A process for the polymerisation of styrene in aqueous suspension which process comprises reacting t-butyl hydroperoxide with sodium formaldehyde sulphoxylate in water at a pH of less than 7, subsequently adding a suspending agent, styrene and catalyst, and polymerising the styrene.

2. A process according to claim 1 wherein the catalyst is benzoyl peroxide, tertiary butyl perbenzoate, lauryol peroxide, ditertiary butyl peroxide or 2-azo-bis-isobutyronitrile.

3. A process according to claim 1 wherein the polymerisation is effected at a temperature in the range 40° to 200° C.

4. A process according to claim 3 wherein the polymerisation is effected at a temperature in the range 70° to 140° C.

References Cited

UNITED STATES PATENTS

| | | | |
|---|---|---|---|
| 2,497,828 | 2/1950 | Young | 260—93.5 |
| 3,049,522 | 8/1962 | Lowell et al. | 260—93.5 |
| 3,449,311 | 6/1969 | Lowell | 260—93.5 |

JAMES A. SEIDLECK, Primary Examiner

U.S. Cl. X.R.

260—89.1, 89.5, 91.5